United States Patent
Yokoyama

(10) Patent No.: US 9,929,428 B2
(45) Date of Patent: Mar. 27, 2018

(54) POLYMER SOLID ELECTROLYTE, METHOD OF PRODUCTION THEREOF, AND LITHIUM ION SECONDARY BATTERY

(75) Inventor: Tomofumi Yokoyama, Kai (JP)

(73) Assignee: SEIKO EPSON CORPORATION, Tokyo (JP)

( * ) Notice: Subject to any disclaimer, the term of this patent is extended or adjusted under 35 U.S.C. 154(b) by 1621 days.

(21) Appl. No.: 13/462,319

(22) Filed: May 2, 2012

(65) Prior Publication Data

US 2012/0288770 A1 Nov. 15, 2012

(30) Foreign Application Priority Data

May 11, 2011 (JP) ................................. 2011-105926

(51) Int. Cl.
*H01M 10/052* (2010.01)
*H01M 10/056* (2010.01)

(52) U.S. Cl.
CPC ....... *H01M 10/052* (2013.01); *H01M 10/056* (2013.01); *H01M 2300/0065* (2013.01)

(58) Field of Classification Search
CPC ........... H01M 10/056; H01M 10/0562; H01M 2300/0065
See application file for complete search history.

(56) References Cited

U.S. PATENT DOCUMENTS

| | | | |
|---|---|---|---|
| 6,139,815 A * | 10/2000 | Atsumi | C01G 23/003 252/519.2 |
| 6,395,419 B1 | 5/2002 | Kuwahara et al. | |
| 6,645,675 B1 | 11/2003 | Munshi | |
| 2007/0048616 A1 | 3/2007 | Okumura et al. | |
| 2007/0287069 A1 | 12/2007 | Fukui | |
| 2008/0170288 A1 | 7/2008 | Kokeguchi | |

FOREIGN PATENT DOCUMENTS

| | | |
|---|---|---|
| CN | 1372705 A | 10/2002 |
| JP | H10-275521 A | 10/1998 |
| JP | H11-213753 A | 8/1999 |
| JP | 2000-123633 A | 4/2000 |
| JP | 2002-190324 A | 7/2002 |
| JP | 2002-280072 A | 9/2002 |
| JP | 2004-339422 A | 12/2004 |
| JP | 2006-261024 A | 9/2006 |
| JP | 2007-280658 A | 10/2007 |
| JP | 2009-9703 A | 1/2009 |
| WO | 2006-082697 A1 | 8/2006 |
| WO | 2009-078263 A1 | 6/2009 |

OTHER PUBLICATIONS

Kim et al., "Characteristics of PVdF-HFP/TiO2 composite membrane electrolytes prepared by phase inversion and conventional casting methods," Electrochimica Acta, 2006 vol. 51, 5636-5644.

* cited by examiner

*Primary Examiner* — Ula C Ruddock
*Assistant Examiner* — Frank A Chernow
(74) *Attorney, Agent, or Firm* — Oliff PLC

(57) ABSTRACT

A polymer solid electrolyte is provided that includes anatase-type titanium oxide, a lithium electrolyte salt, and an ion conductive polymer that binds the titanium oxide.

10 Claims, 1 Drawing Sheet

POLYMER SOLID ELECTROLYTE, METHOD OF PRODUCTION THEREOF, AND LITHIUM ION SECONDARY BATTERY

BACKGROUND

1. Technical Field

The present invention relates to polymer solid electrolytes, methods of production thereof, and lithium ion secondary batteries.

2. Related Art

Along with the development of portable electronic devices such as portable personal computers and video cameras, higher energy density and longer charge and discharge cycle are needed for secondary batteries used for these devices. There are also increasing demands for safety arising from the need to install the secondary batteries in medical electronic devices and in automobile equipment that becomes high temperature.

Lead batteries, nickel-cadmium batteries, and nickel-hydrogen batteries are known examples of secondary batteries widely used in electronic devices, and these batteries are installed in a wide range of devices from automobile equipment to personal portable electronic devices. In recent years, lithium ion secondary batteries have been put to actual applications and are widely used as secondary batteries having higher voltage and higher capacity density than other common batteries.

An electrolyte used for the secondary batteries is typically an acidic or alkaline aqueous solution, and the lithium ion secondary batteries use an organic electrolytic solution to avoid reaction between lithium and water. However, these liquids are dangerous because a leakage causes damage to the device or chemical damage to the human body, or may lead to accidents such as smoking and fire. It is therefore necessary to be considerate of design and environment to avoid leakage. Further, in the lithium ion secondary batteries, repeated charge and discharge cycle causes deposition of needle-like lithium metal (dendrites). This may damage the internal structure of a cell and cause shorting, which may pose serious danger such as heat generation and bursts. There have been attempts addressing these issues and concerns.

For example, JP-A-2006-261024 discloses a gel electrolyte obtained by preparing a mixed solution of a 1:1 (molar ratio) mixture of a borate ester of diethylene glycol monomethacrylate and a borate ester of triethylene glycol monomethyl ether, a 1:1 (volume ratio) mixed solvent of ethylene carbonate and diethyl carbonate, $LiBF_4$, and a polymerization initiator, passing the solution between a pair of stainless steel electrodes, and maintaining the solution in a sealed container at 65° C. for 2 hours.

For example, JP-A-2009-9703 discloses an ion conductive solid electrolyte film obtained as follows. A 2-cyanoethylacrylate monomer (70 g), a polymerization solvent (acetone; 163 g), a radical initiator (2,2'-azobisisobutyronitrile), and a chain transfer agent (lauryl mercaptan) are allowed to react to one another. A $LiClO_4$ acetone solution is then mixed with poly(2-cyanoethylacrylate) obtained after precipitating, purifying, and drying the reaction mixture, and the resulting mixture is dried under reduced pressure after removing the solvent.

The gel electrolyte disclosed in JP-A-2006-261024 still inherently involves the risk of fire, because the fire or burst may occur as the solvent leaches out under heat or increased pressure, or needle-like dendrites may develop and damage a separator to generate heat or cause fire. The organic solid electrolyte disclosed in JP-A-2009-9703 is also problematic, because it has low ion conductivity at ordinary temperature and may require a thin layer thickness or a temperature at or above a softening point, or may cause shorting due to a rupture resulting from insufficient strength of the thin layer, or may generate the dendrites during the charge and discharge under heat.

SUMMARY

An advantage of some aspects of the invention is to provide a polymer solid electrolyte that has sufficient strength even when provided as a thin layer, and does not cause shorting due to a rupture or dendrite growth, and that has excellent ion conductivity even at ordinary temperature.

The present inventors conducted intensive studies, and found that the above advantage can be attained using a polymer solid electrolyte in which a lithium electrolyte salt-containing ion conductive polymer binds anatase-type titanium oxide, thus completed the invention.

The invention can be implemented as the following configurations.

[1] A polymer solid electrolyte that includes: anatase-type titanium oxide; a lithium electrolyte salt; and an ion conductive polymer that binds the anatase-type titanium oxide.

[2] The polymer solid electrolyte according to [1], wherein the ion conductive polymer is polyvinylidene fluoride.

[3] The polymer solid electrolyte according to [1] or [2], wherein the content of the ion conductive polymer is 2.5 to 20 mass % with respect to the total mass of a mixture of the ion conductive polymer and the anatase-type titanium oxide.

[4] The polymer solid electrolyte according to any of [1] to [3], wherein the content of the anatase-type titanium oxide is 20 to 90 mass % with respect to the total mass of the polymer solid electrolyte.

[5] The polymer solid electrolyte according to any of [1] to [4], wherein the lithium electrolyte salt includes at least one of LiN $(SO_2CF_3)_2$ and $LiN(SO_2C_2F_5)_2$.

[6] A method for producing a polymer solid electrolyte including: mixing an ion conductive polymer and a lithium electrolyte salt to prepare a mixed solution; dispersing anatase-type titanium oxide in the mixed solution to prepare a mixed dispersion; and applying the mixed dispersion to a base material, and removing a solvent contained in the mixed dispersion by heating to produce a laminar polymer solid electrolyte.

[7] The method according to [6], further including: detaching the laminar polymer solid electrolyte from the base material and pulverizing the laminar polymer solid electrolyte to obtain an anatase-type titanium oxide powder surface-coated with the ion conductive polymer; and compressing the powder to obtain a pellet-like polymer solid electrolyte.

[8] A lithium ion secondary battery that includes: a positive electrode; a negative electrode; and the polymer solid electrolyte of any of [1] to [5], or the polymer solid electrolyte obtained by the method of [6] or [7], disposed between the positive electrode and the negative electrode.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
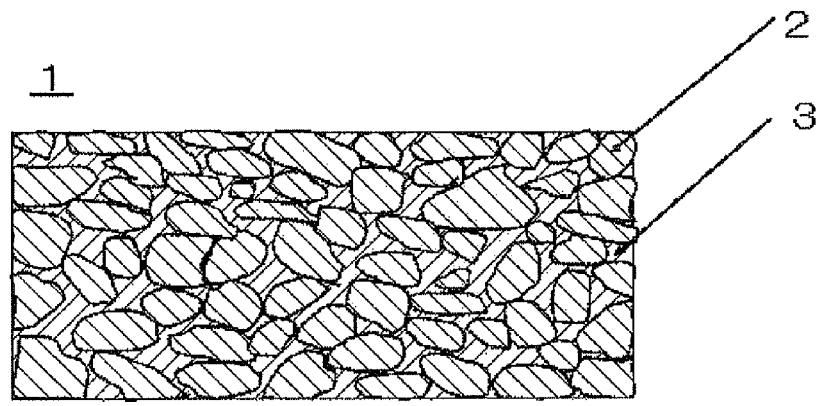
FIG. 1 is a diagram schematically representing a cross section of a polymer solid electrolyte.

The following specifically describes embodiments of the invention. It should be noted that the invention is not restricted to the embodiments below, and may be applied in many variations within the scope of the invention.

Polymer Solid Electrolyte

A polymer solid electrolyte according to an embodiment of the invention includes anatase-type titanium oxide, a lithium electrolyte salt, and an ion conductive polymer that binds the anatase-type titanium oxide. Ion conductivity at a particle gap can be improved as the ion conductive polymer with the added lithium electrolyte salt bonds inorganic oxide particles. Adding the lithium electrolyte salt to the polymer lowers the polymer crystallinity and improves the ion conductivity. It was found that the ion conductivity specifically improves by adding anatase phase crystal grains of titanium oxide to the polymer.

Inorganic Oxide

The polymer solid electrolyte contains the anatase-type titanium oxide as inorganic oxide. With the anatase-type titanium oxide contained as the inorganic oxide in the polymer solid electrolyte, it is possible to provide sufficient strength even for a thin electrolyte layer, and to suppress the generation of shorting due to cracking seen in the polymer solid electrolytes of related art.

Because a crystalline phase of the titanium oxide contained as the inorganic oxide in the polymer solid electrolyte is anatase, the ion conductivity can notably increase in an ordinary temperature range, and a solid electrolyte having high ion conductivity can be obtained. Though an underlying principle remains unclear, this is presumably due to anions captured at an interface between polarized inorganic oxide particles and the polymer, facilitating the movement of cationic lithium ions.

It was found that the use of the anatase-type titanium oxide as the inorganic oxide improves the ion conductivity ten to several hundred-fold at ordinary temperature, compared to other inorganic oxides (including a rutile-type, another crystalline phase of titanium oxide).

Aside from titanium oxide, preferred examples of other inorganic oxides include, but are not particularly limited to, oxides of silicon, zirconium, aluminum, germanium, lanthanum, chromium, magnesium, lithium, gallium, zinc, and iron, because these oxides are thermally and chemically stable. The inorganic oxides other than titanium oxide may be used either alone or as a mixture of two or more. Composite oxides including two or more of the foregoing elements also may be used.

The shape and size of the inorganic oxide are not particularly limited. Because the electrolyte layer is provided as a thin layer, the inorganic oxide preferably has an average particle diameter no greater than a desired thickness of the layer, more preferably no greater than $\frac{1}{10}$ of the thickness, further preferably no greater than $\frac{1}{100}$ of the thickness. Specifically, when the electrolyte layer is 50 μm, use of 500-nm or smaller particles makes it possible to provide an electrolyte layer of excellent strength having a uniform inorganic oxide distribution.

In this specification, the average particle diameter is measured by using, for example, laser diffraction or dynamic light scattering techniques with a designated measurement device.

The anatase-type titanium oxide content may be 20 to 90 mass %, preferably 24 to 90 mass %, more preferably 61 to 86 mass % with respect to the total mass (100 mass %) of the polymer solid electrolyte. In these content ranges, excellent ion conductivity specific to the anatase-type titanium oxide can be realized while providing high durability against internal shorting during a high-temperature drive.

It should be noted that the upper limit (90 mass %) assumes that the ion conductive polymer content is 2.5 mass % with respect to the anatase-type titanium oxide content, and that the lithium electrolyte salt is a molar equivalent corresponding to 0.8 times the mole number of a monomer forming the ion conductive polymer. The lower limit (24 mass %) assumes that the ion conductive polymer content is 20 mass % with respect to the anatase-type titanium oxide content, and that the lithium electrolyte salt is a molar equivalent corresponding to 2.5 times the mole number of the monomer forming the ion conductive polymer. Note, however, that the upper and lower limits are not limited to the foregoing assumed values, because the mass of the polymer solid electrolyte slightly varies depending on the types of the lithium electrolyte salt and the ion conductive polymer.

When the inorganic oxides other than the anatase-type titanium oxide are contained, the inorganic oxide content is preferably 50 to 90 mass % with respect to the total mass (100 mass %) of the polymer solid electrolyte. In this content range, it is possible to obtain a sufficient strength that does not cause shorting even with a thin layer thickness while developing ion conductivity.

Lithium Electrolyte Salt

Examples of the lithium electrolyte salt contained in the polymer solid electrolyte include, but are not particularly limited to, $LiN(SO_2CF_3)_2$, $LiBR_4$ (where R is phenyl or alkyl), $LiPF_6$, $LiSbF_6$, $LiAsF_6$, $LiBF_4$, $LiClO_4$, $LiN(CN)_2$, $LiC(CN)_3$, $LiN(SO_2C_2F_5)_2$, $LiSO_3CF_3$, $LiSO_3C_6F_9$, $LiSO_3C_8F_{17}$, $LiN(CN)_2$, $LiC(CN)_3$, and $LiN(SCN)_2$. Of these, at least one of imide salt electrolyte salts $LiN(SO_2CF_3)_2$ and $LiN(SO_2C_2F_5)_2$ is preferred for their excellent thermal and chemical stability.

The lithium electrolyte salts may be used either alone or as a mixture of two or more.

The lithium electrolyte salt content is preferably 7 to 70 mass %, more preferably 12 to 36 mass % with respect to the total mass (100 mass %) of the polymer solid electrolyte. In these content ranges, excellent ion conductivity can be imparted to the complex polymer solid electrolyte, and sufficient strength can be maintained even at high temperatures.

Ion Conductive Polymer

The ion conductive polymer contained in the polymer solid electrolyte binds the anatase-type titanium oxide. The ion conductive polymer is preferably at least one of a polymer that has ion conductivity as an inherent property, and a high-melting-point polymer that does not have ion conductivity as an inherent property.

Polyethylene oxide often used as the ion conductive polymer in related art cannot provide desirable ion conductivity unless being warmed or heated. However, because a melting point of the polyethylene oxide is 54 to 65° C., the polyethylene oxide softens when heated to 100° C. or more. The polyethylene oxide thus cannot maintain strength, and causes shorting due to rupture. Further, softening of the polyethylene oxide causes dendrites to grow at a particle gap, and shorting occurs as a result of high-temperature charge and discharge.

The high-melting-point polymer electrolyte is thus used that does not soften and maintains strength even in a high temperature environment (for example, inside an automobile). Shorting can thus be prevented because rupture is unlikely to occur even in this kind of environment, and because the dendrite growth can be suppressed under the repeated charge and discharge cycle.

The high-melting-point polymers generally have poor ion conductivity. However, high ion conductivity at ordinary temperature, and high strength at high temperature can be realized by combining the lithium electrolyte salt and the anatase-type titanium oxide. More specifically, the improved ion conductivity by addition of the anatase-type titanium oxide allows for use of the high-melting-point polymer of low ion conductivity as a binder. In this way, a strong electrolyte layer can be obtained that maintains strength even under the high-temperature environment, and that does not cause the rupture or dendrite growth even when provided as a thin layer.

The high-melting-point polymer usable as the ion conductive polymer is a polymer having a melting point of preferably 100° C. or more, more preferably 120 to 170° C., because such polymers do not melt or soften even under high temperatures of 100° C. and higher, and do not cause shorting due to a film rupture or dendrites. Preferred examples of the high-melting-point polymer include, but are not particularly limited to, polyvinylidene fluoride, polytetrafluoroethylene, polyvinylidenechloride, polyethylene terephthalate, polystyrene, and derivatives of these. Of these, the polyvinylidene fluoride is preferably used because of relatively easy availability, good processibility (dissolves in common organic solvents), and excellent strength.

The ion conductive polymers may be used either alone or as a mixture of two or more. Copolymers of the high-melting-point polymers exemplified above also may be used.

The ion conductive polymer content is preferably 2.5 to 20 mass %, more preferably 2.5 to 5.0 mass % with respect to the total mass (100 mass %) of a polymer and anatase-type titanium oxide mixture. In these content ranges, the ion conductivity can be further improved.

Additional Components

The polymer solid electrolyte may include components other than the anatase-type titanium oxide, the lithium electrolyte salt, and the ion conductive polymer. Examples of such components include, but are not particularly limited to, amorphous or crystalline inorganic solid electrolyte particles.

As described above, the polymer solid electrolyte of the present embodiment has sufficient strength even when provided as a thin layer, does not cause shorting due to a rupture or dendrite growth, and has sufficient ion conductivity even at ordinary temperature. More specifically, with the configuration including the inorganic oxide particles as the main component, the polymer solid electrolyte of the present embodiment can maintain high strength even when the electrolyte layer is provided as a thin layer, and can suppress the shorting caused by the rupture of the electrolyte layer seen in the polymer solid electrolytes of related art. Further, the polymer present between the inorganic oxide particles binds (bonds) the particles to each other, and can further improve mechanical strength. The lithium electrolyte salt added to the polymer can further improve the ion conductivity at the particle gap.

Polymer Solid Electrolyte Producing Method

A method for producing the polymer solid electrolyte of the present embodiment includes mixing the ion conductive polymer and the lithium electrolyte salt to prepare a mixed solution (hereinafter, also referred to as a "first step"), dispersing the anatase-type titanium oxide in the mixed solution to prepare a mixed dispersion (hereinafter, also referred to as a "second step"), and applying the mixed dispersion to a base material, and removing a solvent by heating to produce a laminar polymer solid electrolyte (hereinafter, also referred to as a "third step").

In the first step, the ion conductive polymer is first dissolved in a solvent such as dimethylformamide to prepare a polymer solution. Separately, the lithium electrolyte salt is dissolved in a solvent such as ethylene carbonate to prepare a lithium electrolyte solution. These solutions are then mixed to obtain a mixed solution of the ion conductive polymer and the lithium electrolyte salt.

The content (molar quantity) of the lithium electrolyte salt in the mixed solution is preferably 0.8 times or greater the molar quantity of monomer units of the ion conductive polymer to obtain desirable ion conductivity. In order to stabilize the state of the polymer solid electrolyte layer, the lithium electrolyte salt content is preferably 0.8 to 2.5 times the amount of the monomer unit. For mixing, the polymer solution and the lithium electrolyte solution may be simply mixed, or a powder of the lithiumelectrolyte salt may be directly added to the polymer solution.

In the second step, the anatase-type titanium oxide is mixed and dispersed in the mixed solution obtained in the first step, after pulverizing the anatase-type titanium oxide to a desired particle size, so as to prepare a mixed dispersion. Examples of a dispersing method include, but are not limited to, ultrasonic irradiation.

In the third step, the mixed dispersion obtained in the second step is applied to a base material. The base material is then heated to remove a solvent component in the mixed dispersion, and obtain a layer in which anatase-type titanium oxide particles bind to the ion conductive polymer. The base material is preferably one that has a smooth flat surface and excellent heat resistance. Specific examples of such base materials include a polytetrafluoroethylene board, a glass plate, and an aluminum foil. The base material with the applied mixed dispersion is heated at a temperature of preferably about 90 to 130° C.

The layer obtained in the third step may directly be used as the electrolyte layer, or may be used as material of the next fourth step when the polymer solid electrolyte is to be obtained in a pellet form advantageous for molding. In the former, methods such as spin coating and blade coating are preferably used as an application method in the third step, because these methods enable a uniform thin layer to be obtained. The application method used in the latter is not particularly limited.

The producing method of the present embodiment may also include a step of detaching the laminar polymer solid electrolyte from the base material and pulverizing the polymer solid electrolyte to obtain an anatase-type titanium oxide powder surface-coated with the ion conductive polymer (hereinafter, also referred to as a "fourth step"), and a step of compressing the powder to obtain a pellet-like polymer solid electrolyte (hereinafter, also referred to as a "fifth step"). With the fourth and fifth steps in the producing method of the present embodiment, a polymer solid electrolyte of a pellet form advantageous for molding can be produced.

In the fourth step, the layer obtained in the third step is detached from the base material, and the layer is pulverized. In this way, anatase-type titanium oxide powders (particles) surface-coated with the ion conductive polymer can be obtained. Examples of a pulverization method include, but are not limited to, pulverizing using a mixer, and grinding using an agate mortar.

In the fifth step, the powders (particles) obtained in the fourth step are compressed to produce a pellet-like polymer solid electrolyte. Examples of a compression method include, but are not limited to, charging the powder into a dice and compressing the powder under applied load under the reduced pressure created in the dice. The shape and size of the dice are not particularly limited, and may be appropriately selected according to the shape of the pellet to be obtained. Compression temperature is preferably a temperature at or above the softening point of the polymer, in order to desirably bond the particles.

FIG. 1 is a schematic diagram illustrating a cross section of the polymer solid electrolyte. As illustrated in FIG. 1, a layer 1 of the polymer solid electrolyte obtained after the fifth step includes uniformly distributed particles 2, and a lithium electrolyte salt-containing ion conductive polymer 3 filling a gap between the particles 2 and thereby coating and binding the particles 2.

Lithium Ion Secondary Battery

Figure 2:
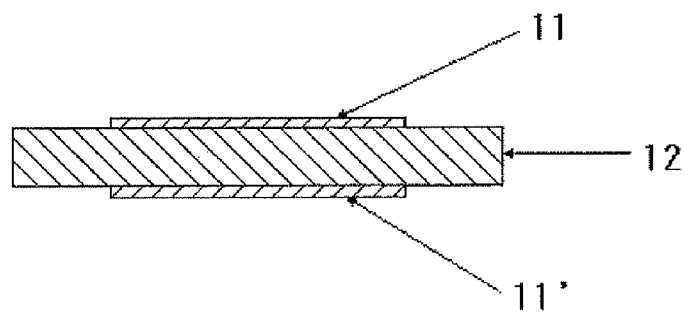
FIG. 2 is a schematic diagram representing the polymer solid electrolyte that has electrodes formed on front and back surfaces.

A lithium ion secondary battery according to an embodiment of the invention is formed by disposing the polymer solid electrolyte of the foregoing embodiment between a positive electrode and a negative electrode. FIG. 2 is a schematic diagram illustrating the polymer solid electrolyte with electrodes formed on front and back surfaces. As illustrated in FIG. 2, the lithium ion secondary battery includes a positive electrode 11, a negative electrode 11', and a polymer solid electrolyte layer 12 disposed between the positive electrode 11 and the negative electrode 11'.

Examples of a positive electrode active material used for the positive electrode include, but are not particularly limited to, metallic compounds such as CuO, $Cu_2O$, $Ag_2O$, CuS, $CuSO_2$, TiS, $SiO_2$, SnO, $V_2O_5$, $V_6O_{13}$, $VO_x$, $Nb_2O_5$, $Bi_2O_3$, $CrO_3$, $Cr_2O_3$, $MoO_3$, $MoS_2$, $WO_3$, $SeO_2$, $MnO_2$, $Mn_2O_1$, $Fe_2O_3$, FeO, $Fe_3O_4$, $Ni_2O_3$, NiO, and $CoO_2$; and conductive polymer materials such as polypyrrole and polyacene.

Examples of a negative electrode active material used for the negative electrode include, but are not particularly limited to, alkali metals, alkali alloys, the compounds exemplified above as the positive electrode active materials, and carbon materials. The alkali metals and alkali alloys are preferably Li, or Li-based alloys such as Li—Al, Li—Mg, and Li—Al—Ni. When producing the positive electrode and negative electrode, materials such as a binder and a conductive agent are generally added. The materials used as such binders and conductive agents are not particularly limited.

When the polymer solid electrolyte of the foregoing embodiment is used for the lithium ion secondary battery, a sufficient output can be obtained even in an ordinary temperature range. Further, a safe lithium ion secondary battery can be provided that does not pose the risk of shorting due to the dendrites even when charged and discharged in the high-temperature environment such as in the automobile.

The lithium ion secondary battery of the present embodiment can be suitably used for various mobile devices, particularly car mobile devices that need to operate normally in the high-temperature environment.

EXAMPLES

The following describes the embodiments of the invention in more details based on examples. The embodiments, however, are not limited to the following examples.

Example 1

A relationship between the inorganic oxide and the ion conductivity was examined in this Example and in Comparative Examples 1 to 6 described later. The polymer solid electrolyte layer was produced according to the following method.

A pellet-like polyvinylidene fluoride (available under a product name PVdF from Sigma-Aldrich Japan) was used as the ion conductive polymer. The pellet was dissolved in dimethylformamide to prepare a polymer solution. A 1 mol/L solution of the lithium electrolyte salt prepared by dissolving $LiN(SO_2C_2F_5)_2$ (Kishida Chemical Co., Ltd.) in ethylene carbonate was added and mixed with the polymer solution to obtain a mixed solution of the lithium electrolyte salt and the polymer. The lithium electrolyte salt was added in 2.5 times a molar quantity of a polyvinylidene fluoride monomer unit.

Subsequently, the anatase-type titanium oxide (Kanto Chemical Co., Inc) was ground with an agate mortar for at least 3 hours, and added to the mixed solution. The powder was then dispersed by ultrasonic irradiation to obtain a mixed dispersion. The mixed dispersion was cast onto a base material (Teflon® tray; Kokugo Co , Ltd), heated to 100° C., and maintained for 10 hours to remove a solvent. As a result, a layer containing the polyvinylidene fluoride binding to anatase-type titanium oxide particles was obtained. The layer was detached from the base material, pulverized with a mixer, and ground with an agate mortar. This produced anatase-type titanium oxide particles (powders) surface-coated with the polyvinylidene fluoride.

The powder (100 mg) was charged into a circular dice having an inner diameter of 10.00 mm, and compressed at a compression temperature of 140° C. for 1 min under the applied load of 5 t/cm$^2$ under the reduced pressure created inside the dice. As a result, a disc-shaped pellet having a diameter of 10.00 mm and a thickness of 0.5 mm (polymer solid electrolyte layer) was obtained.

Comparative Examples 1 to 6

Polymer solid electrolyte layer pellets were produced in the same manner as in Example 1, except that rutile-type titanium oxide (Comparative Example 1), $Li_{0.33}La_{0.56}TiO_3$ (Comparative Example 2), $LiTi_2(PO_4)_3$ (Comparative Example 3), $Al_2O_3$ (Comparative Example 4), $Nb_2O_5$ (Comparative Example 5), and $ZrO_2$ (Comparative Example 6) were used as inorganic oxide particles, instead of the anatase-type titanium oxide.

Lithium Ton Conductivity Measurement Method

The lithium ion conductivity of the polymer solid electrolyte layer pellets (hereinafter, also referred to simply as "electrolyte layers") obtained as above was measured as follows.

First, electrodes were formed on the front and back sides of the electrolyte layer. Here, a punched circular indium foil (diameter 5.0 mm; thickness 0.03 mm) was attached (FIG. 2).

The electrolyte layer with the electrodes was then installed in a measurement cell, and an alternate current impedance was measured. Complex impedances at swept frequencies of 0.01 to 1,000,000 Hz were plotted against a complex plane representing an imaginary component and a real component on vertical and horizontal axes, respectively. The diameter of a semicircle appearing on the plane was then taken as an electrical resistance.

Ion conductivity (S/cm) can be calculated according to the following equation:

Ion conductivity=$L/(R \times A)$, where R (S) is the electrical resistance, L (cm) is the electrolyte pellet thickness, and A (cm$^2$) is the electrode area.

The measured ion conductivities (lithium ion conductivities) for Example 1 and Comparative Examples 1 to 6 are presented in Table 1.

TABLE 1

|  | Inorganic oxide | Ion conductivity (S/cm) |
|---|---|---|
| Example 1 | Anatase-type titanium oxide | $6.99 \times 10^{-4}$ |
| Comparative Example 1 | Rutile-type titanium oxide | $6.96 \times 10^{-8}$ |
| Comparative Example 2 | $Li_{0.33}La_{0.56}TiO_3$ | $1.39 \times 10^{-7}$ |
| Comparative Example 3 | $LiTi_2(PO_4)_3$ | $9.17 \times 10^{-8}$ |
| Comparative Example 4 | $Al_2O_3$ | $2.06 \times 10^{-8}$ |
| Comparative Example 5 | $Nb_2O_5$ | $2.32 \times 10^{-7}$ |
| Comparative Example 6 | $ZrO_2$ | $7.34 \times 10^{-7}$ |

Examples 2 to 5

In Examples 2 to 5, a relationship between different types of the ion conductive polymers and the ion conductivity was examined. The polymer solid electrolyte layer was produced according to the following method.

First, the following ion conductive polymers were prepared.

Example 2: PVdF (Sigma Aldrich Japan; product name, polyvinylidene fluoride; melting point 170° C.)

Example 3: PEO 4,000 (NOF Corporation; product name, polyethylene oxide; weight-average molecular weight 4,000; melting point 64° C.)

Example 4: PEO 60,000 (Sigma Aldrich Japan; product name, polyethylene oxide; weight-average molecular weight 60,000; melting point 66° C.)

Example 5: SBR (JSR; product name, styrene-butadiene rubber aqueous dispersion; melting point 120° C. (the upper limit temperature))

Note that the polyethylene oxide was prepared as a 10 mass % solution by being dissolved in diethyl carbonate (Kanto Kagaku).

LiN(SO$_2$C$_2$F$_5$)$_2$ was dissolved as the lithium electrolyte salt in these polymer solutions or polymer dispersions in 2.5 equivalents with respect to the mole number of the monomer forming the polymer (hereinafter, simply "monomer mole number"). The anatase-type titanium oxide particles (Kanto Kagaku) were then added as in Example 1 to make a dry polymer mass concentration 5 mass % with respect to the total mass (100 mass %), and the particles were dispersed by ultrasonic irradiation.

The dispersion so obtained was dried by being heated at 100° C. for about 5 hours under reduced pressure to remove a solvent, and a resulting solid was pulverized with an agate mortar. The pulverized particles were compressed at 620 MPa to produce a tablet-like polymer solid electrolyte layer (φ10 mm).

As controls for Examples 2 to 5, solids were prepared by removing the solvent without adding the anatase-type titanium oxide particles after dissolving LiN(SO$_2$C$_2$F$_5$)$_2$ to the four kinds of polymer solutions or polymer dispersions.

The results of measured ion conductivities (lithium ion conductivities) for Examples 2 to 5 and controls are presented in Table 2. The same measurement method used in Example 1 was used.

TABLE 2

|  | Ion conductive polymer | Ion conductivity of anatase-added system (S/cm) | Ion conductivity of anatase-free system (S/cm) |
|---|---|---|---|
| Example 2 | PVdF | $6.99 \times 10^{-4}$ | $6.39 \times 10^{-6}$ |
| Example 3 | PEO4,000 | $1.27 \times 10^{-4}$ | $2.32 \times 10^{-4}$ |
| Example 4 | PEO60,000 | $8.79 \times 10^{-5}$ | $1.03 \times 10^{-4}$ |
| Example 5 | SBR | $2.07 \times 10^{-12}$ | — |

Example 6

In this Example, a relationship between an ion conductive polymer mixture ratio and the ion conductivity was examined.

A PVdF dimethylformamide solution was added to an anatase-type titanium oxide powder to make a PVdF concentration 2.5 to 20 mass %, and LiN (SO$_2$C$_2$F$_5$)$_2$ was added in 2.5 equivalents with respect to the monomer mole number. A system without PVdF was also prepared. A polymer dispersion so obtained was dried by being heated at 100° C. for about 5 hours under reduced pressure to remove a solvent, and a resulting solid was pulverized with an agate mortar. The pulverized particles were compression-molded at 620 MPa to produce a tablet-like polymer solid electrolyte layer (φ10.00 mm). The ion conductivity (lithium ion conductivity) of the polymer solid electrolyte layer was determined using the same measurement method used in Example 1. The results are presented in Table 3.

TABLE 3

| Mixture ratio (mass %) | Lithium ion conductivity (S/cm) |
|---|---|
| 0.0 | $1.03 \times 10^{-8}$ |
| 2.5 | $2.95 \times 10^{-5}$ |
| 5.0 | $6.99 \times 10^{-4}$ |
| 10.0 | $9.88 \times 10^{-6}$ |
| 15.0 | $3.52 \times 10^{-6}$ |
| 20.0 | $3.50 \times 10^{-6}$ |

It can be seen from Table 3 that the highest lithium ion conductivity occurs when the mixture ratio of the ion conductive polymer is about 5 mass %.

Example 7

In this Example, a relationship between different types of the lithium electrolyte salts and the ion conductivity was examined.

The lithium electrolyte salt was added to a 10 mass % PVdF dimethylformamide solution in 2.5 equivalents with respect to the monomer mole number. Four kinds of the lithium electrolyte salts LiN $(SO_2C_2F_5)_2$, LiN$(SO_2CF_3)_2$, LiPF$_6$, and LiClO$_4$ were used. An anatase-type titanium oxide powder was added to polymer solutions containing these salts. A polymer dispersions so obtained were dried by being heated at 100° C. for about 5 hours under reduced pressure to remove a solvent, and a resulting solid was pulverized with an agate mortar. The pulverized particles were compression-molded at 620 MPa to produce a tablet-like polymer solid electrolyte layer ($\varphi$10.00 mm). The ion conductivity (lithium ion conductivity) of the polymer solid electrolyte layer was determined using the same measurement method used in Example 1. The results are presented in Table 4.

TABLE 4

| | Support electrolyte salt | | | |
|---|---|---|---|---|
| | LiN$(SO_2CF_3)_2$ | LiN$(SO_2C_2F_6)_2$ | LiPF$_6$ | LiClO$_4$ |
| σLi (S/cm) | 6.73 × 10$^{-4}$ | 6.99 × 10$^{-4}$ | 5.44 × 10$^{-4}$ | 6.08 × 10$^{-4}$ |

It was inferred from Table 4 that the ion conductivity of the polymer solid electrolyte of the embodiment of the invention hardly varies for the different types of the lithium electrolyte salts added. However, it is known that salts such as LiPF$_6$ release harmful HF by also reacting with water vapor in the atmosphere. LiClO$_4$ is known to exhibit strong corrosiveness in a dissolved state. It was therefore found that LiN$(SO_2C_2F_5)_2$ and LiN$(SO_2CF_3)_2$ were more preferable lithium electrolyte salts with both physical stability (against pyrolysis, heat decomposition, etc.) and chemical stability (against corrosion, etc.).

Example 8

In this Example, a relationship between the lithium electrolyte salt content and the ion conductivity was examined.

A 10% PVdF solution was prepared by dissolving PVdF in dimethylformamide (Kanto Kagaku). The anatase-type titanium oxide particles (Kanto Kagaku) were added to the solution as in Example 1 to make the polymer mass 5 mass % after a solvent was dried, and the particles were uniformly dispersed in the solution by ultrasonic irradiation. LiN $(SO_2C_2F_5)_2$ was dissolved in the dispersion in 0.2 to 3 molar equivalents with respect to the PVdF monomer mole number. A resulting mixture was heated at 100° C. under reduced pressure to remove the solvent, and a particle complex coated and bound by the polymer was obtained. The complex was pulverized, charged into a circular dice ($\varphi$10.00 mm), and compression-molded under 620 MPa pressure. Electrodes were formed on the molded product, and an alternate current impedance and a direct current resistance were measured. The ion conductivity (lithium ion conductivity) was then calculated from these measurement results.

Figure 3:
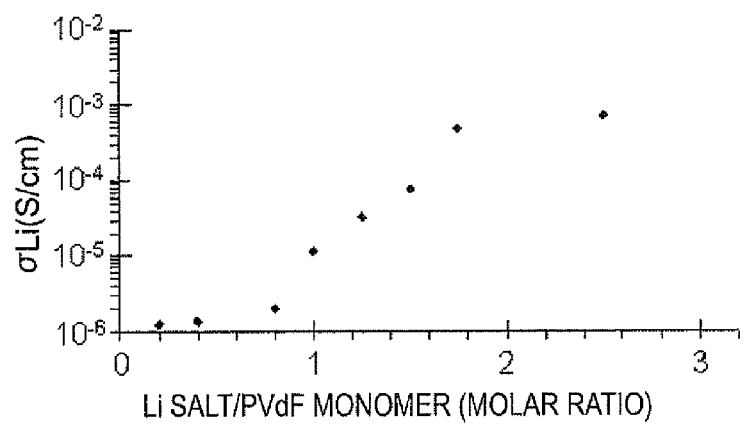
FIG. 3 is a graph representing results of ion conductivity calculations.

The results of ion conductivity calculations are shown in the graph of FIG. 3. Table 5 presents the added amounts of the lithium electrolyte salt and corresponding ion conductivity measured values. Note that "Softened" in the table means that ion conductivity measurement was not possible because of increased plasticity and viscosity at ordinary temperature.

TABLE 5

| Li salt/monomer (molar ratio) | σLi (S/cm) |
|---|---|
| 0.2 | 1.26 × 10$^{-6}$ |
| 0.4 | 1.37 × 10$^{-6}$ |
| 0.8 | 2.02 × 10$^{-6}$ |
| 1 | 1.12 × 10$^{-6}$ |
| 1.25 | 3.17 × 10$^{-6}$ |
| 1.5 | 7.79 × 10$^{-6}$ |
| 1.75 | 4.84 × 10$^{-6}$ |
| 2.5 | 6.99 × 10$^{-6}$ |
| 3 | Softened |

Example 9

In this Example, a relationship between different kinds of the lithium electrolyte salts and the electrical resistance was examined.

A 10 mass % PVdF dimethylformamide solution containing the lithium electrolyte salt LiN$(SO_2C_2F_5)_2$ in 2.5 molar equivalents with respect to the monomer mole number, and a 10 mass % diethyl carbonate solution of polyethylene oxide (PEO 60,000; weight-average molecular weight 60,000) containing LiN$(SO_2C_2F_5)_2$ in the same molar equivalent were prepared.

The anatase-type titanium oxide particles (Kanto Kagaku) were then added to these polymer dispersions as in Example 1 to make the dry polymer mass concentration 5 mass % with respect to the total mass (100 mass %), and the particles were dispersed by ultrasonic irradiation.

The dispersions so obtained were dried by being heated at 100° C. for about 5 hours under reduced pressure to remove a solvent, and a resulting solid was pulverized with an agate mortar. The pulverized particles were compressed at 620 MPa to produce a tablet-like polymer solid electrolyte layer ($\varphi$10.00 mm).

These polymer solid electrolyte layers were used to form cells that had Li metal foil electrodes on the both sides of the electrolyte, and a DC conduction test was performed in a 150° C. high-temperature bath at 1 mA/cm$^2$ (constant current). Table 6 presents data of the DC conduction test (a relationship between conduction time at 150° C. and direct current resistance).

TABLE 6

| Conduction time | DC resistance (Ω) | |
|---|---|---|
| (hour) | PEO60,000 | PVdF |
| 0.00 | 501.5 | 91.1 |
| 0.25 | 104.0 | 84.8 |
| 0.50 | 70.6 | 80.1 |
| 1.00 | 70.1 | 80.4 |
| 2.00 | 70.3 | 87.7 |
| 3.00 | 71.8 | 90.4 |
| 4.00 | 0.10 | 94.0 |
| 5.00 | 0.07 | 98.6 |
| 6.00 | 0.07 | 102.3 |
| 7.00 | 0.07 | 112.8 |
| 8.00 | 0.07 | 121.8 |
| 15.00 | — | 132.9 |
| 25.00 | — | 143.3 |
| 50.00 | — | 145.2 |
| 100.00 | — | 145.7 |

A resistance value fell to 0.1Ω or less in samples using polyethylene oxide, and this was regarded as shorting. Significantly weak mechanical strengths were observed in the electrolyte tablet upon disassembling the measured cells under inert atmosphere. This is believed to be due to the shorting between the Li metal electrodes caused by the liquefaction of the polyethylene oxide at 150° C., and a resulting flowing of the anatase-type titanium oxide particles due to a pressure of a spring provided for the cell to ensure contact between the electrodes and the electrolyte. After 8 hours from the start of conduction, a resistance increase was found to be only about 10% in samples using PVdF.

Example 10

In this Example, a compression pressure of the tablet-like polymer solid electrolyte was examined.

The lithium electrolyte salt $LiN(SO_2C_2F_5)_2$ was dissolved in a dispersion of the ion conductive polymer PVdF in 2.5 equivalents with respect to the monomer mole number. The anatase-type titanium oxide particles were then added to make the dry polymer mass concentration 5 mass % with respect to the total mass (100 mass %), and the particles were dispersed by ultrasonic irradiation.

The dispersion so obtained was dried by being heated at 100° C. for about 5 hours under reduced pressure to remove a solvent, and a resulting solid was pulverized with an agate mortar.

The pulverized product was charged into a press dice, and compressed (pressed) for 1 min under 100 to 720 MPa pressure to obtain a polymer solid electrolyte press-molded product. The ion conductivity (lithium ion conductivity) of the electrolytes formed under these different pressures was then measured at room temperature. The measurement results are presented in Table 7.

TABLE 7

| Pressure (MPa) | Lithium ion conductivity (S/cm) |
| --- | --- |
| 120 | $4.82 \times 10^{-6}$ |
| 240 | $8.55 \times 10^{-5}$ |
| 360 | $6.89 \times 10^{-5}$ |
| 480 | $6.94 \times 10^{-4}$ |
| 600 | $6.99 \times 10^{-4}$ |
| 720 | $6.99 \times 10^{-4}$ |

It was found from Table 7 that the polymer solid electrolyte shows desirable lithium ion conductivity when at least compressed under a pressure of 480 MPa or more.

The entire disclosure of Japanese Patent Application No. 2011-105926, filed May 11, 2011 is expressly incorporated by reference herein.

What is claimed is:

1. A polymer solid electrolyte comprising:
   anatase-type titanium oxide;
   a lithium electrolyte salt; and
   an ion conductive polymer that covers the anatase-type titanium oxide,
   wherein a content of the ion conductive polymer is 2.5 to 5 weight % with respect to the total mass of a mixture of the ion conductive polymer and the anatase-type titanium oxide.

2. The polymer solid electrolyte according to claim 1, wherein the ion conductive polymer is polyvinylidene fluoride.

3. The polymer solid electrolyte according to claim 1, wherein the content of the anatase-type titanium oxide is 20 to 90 weight % with respect to the total mass of the polymer solid electrolyte.

4. The polymer solid electrolyte according to claim 1, wherein the lithium electrolyte salt includes at least one of $LiN(SO_2CF_3)_2$ and $LiN(SO_2C_2F_5)_2$.

5. A lithium ion secondary battery comprising:
   a positive electrode;
   a negative electrode; and
   the polymer solid electrolyte of claim 1, disposed between the positive electrode and the negative electrode.

6. A lithium ion secondary battery comprising:
   a positive electrode;
   a negative electrode; and
   the polymer solid electrolyte of claim 2, disposed between the positive electrode and the negative electrode.

7. A lithium ion secondary battery comprising:
   a positive electrode;
   a negative electrode; and
   the polymer solid electrolyte of claim 3, disposed between the positive electrode and the negative electrode.

8. A lithium ion secondary battery comprising:
   a positive electrode;
   a negative electrode; and
   the polymer solid electrolyte of claim 4, disposed between the positive electrode and the negative electrode.

9. The polymer solid electrolyte according to claim 1, wherein the ion conductive polymer surface coats the anatase-type titanium oxide.

10. The polymer solid electrolyte according to claim 1, wherein the polymer solid electrolyte does not contain a solvent.

* * * * *